(12) United States Patent
Lincoln et al.

(10) Patent No.: US 10,950,108 B2
(45) Date of Patent: Mar. 16, 2021

(54) CHARACTERIZATION OF AEROSOLS

(71) Applicant: Rosemount Aerospace Inc., Burnsville, MN (US)

(72) Inventors: David L. Lincoln, Cromwel, CT (US); Jennifer M. Alexander, Minneapolis, MN (US); Michael T. Gorski, Clinton, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 16/536,970

(22) Filed: Aug. 9, 2019

(65) Prior Publication Data

US 2021/0043056 A1 Feb. 11, 2021

(51) Int. Cl.
*G08B 17/12* (2006.01)
*G01N 21/53* (2006.01)
*G08B 17/107* (2006.01)

(52) U.S. Cl.
CPC ............ *G08B 17/12* (2013.01); *G01N 21/53* (2013.01); *G08B 17/107* (2013.01)

(58) Field of Classification Search
CPC .... G08B 17/103; G08B 13/107; G08B 17/11; G08B 17/113; G08B 13/117; G08B 17/12; G01J 1/00; G01J 3/45; G01J 3/453; G01J 3/4531; G01J 3/4532; G01J 3/4534; G01J 2003/451; G01J 2003/4538
See application file for complete search history.

(56) References Cited

U.S. PATENT DOCUMENTS

| | | | |
|---|---|---|---|
| 3,914,616 A | 10/1975 | Mooibroek | |
| 5,000,566 A * | 3/1991 | Kuppenheimer, Jr. | ... G01P 5/20 340/974 |
| 5,400,014 A | 3/1995 | Behlke et al. | |

(Continued)

FOREIGN PATENT DOCUMENTS

| | | |
|---|---|---|
| CN | 1858579 A | 11/2006 |
| CN | 103558187 A | 2/2014 |

(Continued)

OTHER PUBLICATIONS https://en.wikipedia.org/w/index.php?title=Optical_coating&oldid=84249080"3.
Extended European Search report for EP Application No. 19213484.9, dated Jun. 17, 2020, pp. 9.

*Primary Examiner* — Van T Trieu
(74) *Attorney, Agent, or Firm* — Kinney & Lange, P.A.

(57) ABSTRACT

A method of characterizing an aerosol, the method comprising illuminating aerosol particles located within a measurement volume with a first electromagnetic radiation pulse emitted from a first source and receiving one or more electromagnetic radiation returns that have been scattered by the aerosol particles illuminated by the first electromagnetic radiation pulse at one or more sensors, illuminating the aerosol particles within the measurement volume with a second electromagnetic radiation pulse emitted from a second source and receiving a one or more electromagnetic radiation returns scattered by the aerosol particles illuminated by the second electromagnetic radiation pulse at the one or more sensors, determine at least one of intensity based on the one or more electromagnetic radiation returns, and determine an aerosol parameter based on an algorithm and the at least one intensity.

20 Claims, 4 Drawing Sheets

(56) References Cited

U.S. PATENT DOCUMENTS

| | | | |
|---|---|---|---|
| 6,064,430 | A | 5/2000 | Lefkowitz |
| 6,841,778 | B1 | 1/2005 | Shifflett et al. |
| 7,940,190 | B2 | 5/2011 | Penney |
| 8,773,272 | B2 | 7/2014 | Nagashima |
| 9,666,048 | B2 | 5/2017 | Fischer et al. |
| 2001/0038338 | A1 | 11/2001 | Kadwell et al. |
| 2002/0018204 | A1 | 2/2002 | Sachweh et al. |
| 2003/0046880 | A1 | 3/2003 | Brown et al. |
| 2004/0066512 | A1 | 4/2004 | Politze et al. |
| 2005/0243307 | A1* | 11/2005 | Silcott ............... G01N 15/1459 356/73 |
| 2009/0039249 | A1* | 2/2009 | Wang ............... G01N 15/1459 250/287 |
| 2011/0255087 | A1 | 10/2011 | Alexander et al. |
| 2013/0135607 | A1* | 5/2013 | Wedler ............... G01N 21/53 356/51 |
| 2013/0176131 | A1 | 7/2013 | Pichard et al. |
| 2014/0333928 | A1 | 11/2014 | Erdtmann |
| 2015/0103346 | A1 | 4/2015 | Erdtmann |
| 2015/0346086 | A1 | 12/2015 | Erdtmann |
| 2015/0379845 | A1 | 12/2015 | Fischer et al. |
| 2016/0274024 | A1* | 9/2016 | Han ............... G01N 21/49 |
| 2016/0343226 | A1 | 11/2016 | Fischer et al. |
| 2018/0275038 | A1* | 9/2018 | Cantin ............... G01N 15/0211 |

FOREIGN PATENT DOCUMENTS

| | | |
|---|---|---|
| CN | 103994954 A | 8/2014 |
| CN | 104392577 A | 3/2015 |
| CN | 106769923 A | 5/2017 |
| KR | 20130078252 A | 7/2013 |
| RU | 2500998 C2 | 12/2013 |
| WO | WO2019034821 A1 | 2/2019 |

\* cited by examiner

CHARACTERIZATION OF AEROSOLS

BACKGROUND

This disclosure relates generally to the characterization of aerosols and aerosol particles. More particularly, this disclosure relates to the use of scattered electromagnetic radiation to characterize aerosols and aerosol particles.

Vision systems, such as those for aircraft, require testing in relevant environmental and meteorological conditions capable of affecting visibility conditions. Due to the transient nature of many aerosols, testing the impact of various aerosols, such as fog, ash, or smoke, on visibility conditions is conventionally performed by simulating those conditions in a chamber. However, in order for the simulated conditions to be relevant for testing vision systems, simulated conditions must reflect real-world visibility conditions and, thus, real-world aerosol conditions. For simulations conducted in test chambers, it is further important for the aerosol conditions to be consistent throughout the chamber and to understand variations in aerosol conditions at various positions within the chamber. Specialized equipment exists for measuring characterizing aerosols in test conditions, but this equipment is generally expensive to construct, purchase, and operate.

Aircraft also have a need to characterize aerosols while in flight. Aerosol characterization can aid in, for example, cloud detection and systems to alert pilots to potential icing hazards. Likewise, aerosol characterization can aid in detection of other hazards, such as ash clouds.

SUMMARY

In one example, a method of characterizing an aerosol, the method comprises illuminating aerosol particles located within a measurement volume with a first electromagnetic radiation pulse emitted from a first source, receiving one or more electromagnetic radiation returns that have been scattered by the aerosol particles illuminated by the first electromagnetic radiation pulse at one or more sensors, illuminating the aerosol particles within the measurement volume with a second electromagnetic radiation pulse emitted from a second source, and receiving a one or more electromagnetic radiation returns scattered by the aerosol particles illuminated by the second electromagnetic radiation pulse at the one or more sensors. The first electromagnetic radiation pulse has a first wavelength range and the second electromagnetic radiation pulse has a second wavelength range that is different from the first wavelength range. The method further comprises using a processing device to determine at least one intensity, determine an aerosol parameter, and output the aerosol parameter. The at least one intensity is based on the one or more electromagnetic radiation returns received by the one or more sensors. The aerosol parameter is indicative of an average diameter of the aerosol particles or a concentration of the aerosol particles, is based on an algorithm and the at least one intensity, and is for characterizing the aerosol.

In another example, a system for characterizing an aerosol comprises a first source, a second source, one or more sensors, at least one processor, and computer readable memory. The first source is configured to emit a first electromagnetic radiation pulse and illuminate aerosol particles with the first electromagnetic pulse. The second source is configured to emit a second electromagnetic radiation pulse and illuminate the aerosol particles with the second electromagnetic pulse. The first electromagnetic radiation pulse has a first wavelength range and the second electromagnetic radiation pulse has a second wavelength range that is different from the first wavelength range. The one or more sensors are configured to receive one or more electromagnetic radiation returns scattered by the aerosol particles illuminated by the first electromagnetic radiation pulse and are also configured to receive one or more electromagnetic radiation returns scattered by the aerosol particles illuminated by the second electromagnetic radiation pulse. The computer-readable memory is encoded with instructions that, when executed by the at least one processor, cause the system to illuminate aerosol particles located within a measurement volume with the first electromagnetic radiation pulse, receive one or more electromagnetic radiation returns at the one or more sensors, illuminate the aerosol particles within the measurement volume with the second electromagnetic radiation pulse, and receive one or more electromagnetic radiation returns at the one or more sensors. The computer-readable memory is further encoded with instructions that, when executed by the at least one processor, cause the system to determine at least one intensity, determine an aerosol parameter, and output the aerosol parameter. The at least one intensity is based on the one or more electromagnetic radiation returns received by the one or more sensors. The aerosol parameter is indicative of an average diameter of the aerosol particles or a concentration of the aerosol particles, is based on an algorithm and the at least one intensity, and is for characterizing the aerosol.

DETAILED DESCRIPTION

Figure 1A:
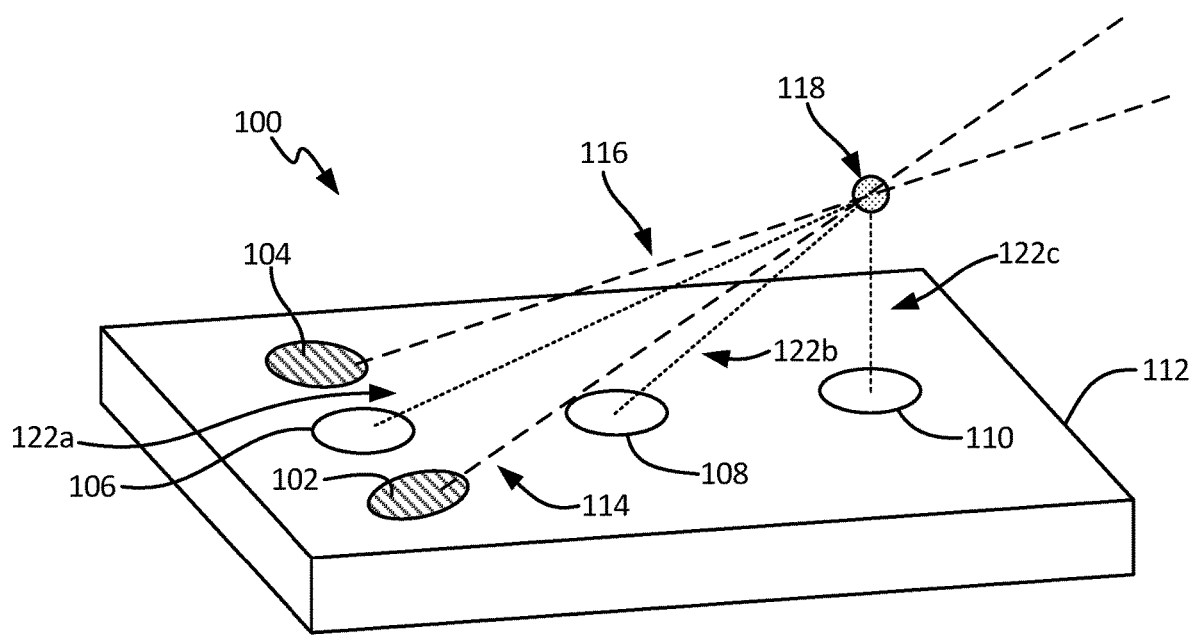
FIG. 1A is a perspective view of an example of a sensor for characterizing aerosols.
Figure 1A:
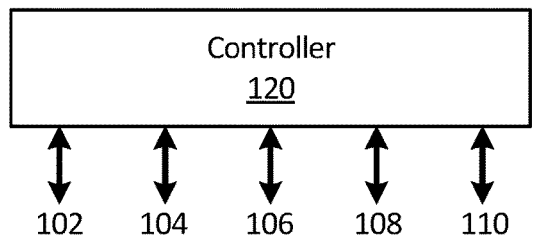

An optical system can be used to characterize aerosols based on the scattering of light scattered by the aerosols. Advantageously, the optical aerosol characterization system disclosed herein allows for cost-effective and reliable characterization of aerosols in test conditions, such as to measure the impact of aerosols on visibility conditions. Further, the present invention allows for chamber-less characterization of aerosols, allowing for the characterization of aerosols in a variety of real-world applications, such as on aircraft.

Generally, the optical system includes at least two sources and at least one sensor. However, it should be understood by a person of ordinary skill in the art that the optical system may also be configured with a single source rather than two or more sources. The sources are capable of emitting electromagnetic radiation to illuminate aerosol particles, each source having different wavelength ranges. The illuminated aerosol particles scatter the emitted electromagnetic radiation as one or more electromagnetic radiation returns. A sensor receives an electromagnetic radiation return and transmits a signal representative of an intensity of the electromagnetic radiation return to a controller. Each source forms a separate measurement channel with the sensor. Generally, the controller is capable of determining the intensity of the electromagnetic radiation return based on the magnitude of the signal. The controller uses the one or more electromagnetic radiation intensities of the returns to determine an aerosol parameter, such as average particle size of the aerosol. Further, the controller is also capable of controlling the sources and thereby the emission of the electromagnetic radiation.

In some examples, the controller can include one or more processors and computer-readable memory encoded with instructions that, when executed by the one or more processors, cause the controller and/or other elements of the optical system to operate in accordance with techniques described herein.

Computer-readable memory of the controller can be configured to store information within the controller during operation. Computer-readable memory, in some examples, can be described as a computer-readable storage medium. In some examples, a computer-readable storage medium can include a non-transitory medium. The term "nontransitory" can indicate that the storage medium is not embodied in a carrier wave or a propagated signal. In certain examples, a non-transitory storage medium can store data that can, over time, change (e.g., in RAM or cache). In some examples, computer-readable memory of the controller can include temporary memory, meaning that a primary purpose of the computer-readable memory is not long-term storage. Computer-readable memory of the controller, in some examples, can be described as a volatile memory, meaning that the computer-readable memory does not maintain stored contents when electrical power to the controller is removed. Examples of volatile memories can include random access memories (RAM), dynamic random access memories (DRAM), static random access memories (SRAM), and other forms of volatile memories. In some examples, computer-readable memory can be used to store program instructions for execution by one or more processors of the controller. For instance, computer-readable memory of the controller can be used by software or applications executed by the controller to temporarily store information during program execution.

Generally, each source emits electromagnetic radiation within an emitting cone that bounds the majority of the electromagnetic radiation emitted by that source. The source may be, for example, a light-emitting diode, lamp, or laser. Likewise, the sensor generally has a receiving cone defining a geometric volume that bounds the possible paths of scattered electromagnetic radiations that can be received by the sensor. The sensor may be, for example, a photodiode. The volume where the emitting cones and receiving cones overlap defines a measurement volume. The optical system is capable of characterizing aerosol particles within the measurement volume. Generally, a given measurement volume defines only a portion of the overall volume of the aerosol particles. The measurement volume may be sized, for example, to detect only a single aerosol particle or may be sized to detect multiple aerosol particles.

The optical system can characterize an aerosol having an unknown concentration, an unknown average particle size, an unknown phase, or an unknown particle type by first taking measurements of aerosols having known concentrations, known average particle sizes, known phase, or known particle type to create training data. Generally, the training data defines a relationship between intensity data and either concentration, average particle size, phase, or particle type. However, in some examples, the training data is organized as a multi-dimensional array, such as a three-dimensional array where one axis corresponds to concentration, one axis corresponds to average diameter, and one axis corresponds to intensity data. The training data may also be organized into higher dimensional arrays containing additional axes corresponding to other aerosol parameters, such as phase or particle type. The intensity data can consist of the intensities from a single channel or can consist of ratios of intensities from multiple channels. For some aerosols, ratios of certain intensity data can be used to determine average particle size. In addition, for some aerosols, combining multiple ratios of intensity data can increase the accuracy of the optical system.

In these examples, the optical system can characterize an aerosol having an unknown concentration or unknown average particle size based on intensity data from one or more channels and an algorithm. The algorithm may, for example, take a ratio of intensities from two or more channels. The algorithm may also, for example, combine multiple ratios of intensity data. Further, the algorithm may use one or more intensity values and/or ratios to determine an aerosol parameter. For example, the algorithm may compare one or more intensity values and/or ratios with training data in order to determine an aerosol parameter. The training data may, for example, be a training curve or a multidimensional array of training data.

For some aerosols, certain channels may be more useful for determining the concentration of aerosols having a low or high concentration, due to potential low signals at low concentrations or signal saturation of the sensor circuit at high concentrations of aerosol. Alternatively, an operational amplifier can be used to increase or decrease the gain of the sensor and thereby improving sensitivity or reduce signal saturation.

The optical system may be configured with additional sensors to measure electromagnetic radiation returns at different locations of the emitting cone or at different angles compared to the emitting cone. Advantageously, this can allow for more accurate characterization of an aerosol parameter, such as aerosol concentration, average particle size, aerosol phase, or aerosol particle type.

Generally, the sources are aimed to emit electromagnetic radiation at and illuminate the same volume of aerosol particles. However, in some examples, the sources may be aimed at different volumes of aerosol particles, including non-overlapping volumes of aerosol particles, as long as their emitting cones overlap at least partially with one or more receiving cones of the sensors. In these examples, pairs or sets of sources and sensors may be oriented such that each pair or set can characterize a separate measurement volume. The characterization of multiple measurement volumes allows for the optical system to measure the consistency of the average diameter or the concentration of aerosol particles at multiple locations relative to the optical system.

In some examples, the sensors may be configured to receive ambient electromagnetic radiation. In these examples, the optical system is also configured to generate ambient intensity data corresponding to the magnitude of the received ambient radiation. Generally, ambient radiation measurements aid in correcting the electromagnetic intensity data and thereby allows for more accurate characterization of aerosols. The optical system is able to correct electromagnetic intensity data based on ambient intensity data, intensity data from one or more channels, and an algorithm. The algorithm may, for example, produce corrected electromagnetic intensity data by subtracting ambient intensity data received by a sensor from electromagnetic intensity data received by the same sensor. Generally, ambient radiation is received by a sensor before a source emits an electromagnetic pulse and the sensor receives an electromagnetic radiation return. Generally, the sensor receives ambient radiation immediately before a source emits an electromagnetic pulse. In some examples, the optical system may reject ambient light signals by capacitive coupling of the sensor to an operational amplifier, such that a higher-frequency signal from a sensor, such as a signal corresponding to an electromagnetic radiation return, is selectively transmitted to the operational amplifier and a low-frequency, continuous signal from the sensor, such as a signal corresponding to ambient light, is blocked and is not transmitted to the operational amplifier. Capacitive coupling can reduce the likelihood of signal saturation of the operational amplifier.

Each source may emit electromagnetic radiation, for example, as a pulse. The pulse may have a duration of 100 μs. Generally, using pulses having a duration of 100 μs or less improves ambient light rejection. For some shorter pulses, the intensity of the corresponding electromagnetic radiation return may be lower than the intensity of ambient light. In these examples, capacitive coupling of the sensor to an operational amplifier may improve detection of the electromagnetic radiation return. In examples where the optical system has two or more sources, emitting electromagnetic radiation as sequential, separate pulses from each source allows for the same sensor or sensors to be used to accurately determine the intensity of scattered electromagnetic radiation returns corresponding to pulses from each source.

In other examples, the optical system may have multiple sensors that are each equipped with optical filters that selectively transmit a range of wavelengths of electromagnetic radiation. The optical filters may be configured to, for example, selectively transmit a range of wavelengths of electromagnetic radiation emitted by one source and exclude a range of wavelengths of electromagnetic radiation emitted by another source. The optical filters may also be configured to exclude ambient light. This configuration allows the system to illuminate the aerosol particles with electromagnetic radiation from each wavelength range near-simultaneously, rather than sequentially, while accurately determining the intensity of electromagnetic radiation returns in each wavelength range. Rather than using optical filters, the optical system may also have sources configured to emit, for example, a range of wavelengths of electromagnetic radiation within a single color range. The sources may also be multi-color sources configured to emit a range of wavelengths of electromagnetic radiation across several color ranges.

In other examples, the sensors may be configured to selectively receive a single wavelength or a limited range of wavelengths of electromagnetic radiation returns without the use of optical filters. The sensors may also be configured to receive electromagnetic radiation emitted from multiple sources where the sources are configured to emit separate ranges of wavelengths of electromagnetic radiation.

In some examples, the optical system is configured to measure intensity from each channel at a frequency of 16.66 hz. In other examples, the optical system is configured to measure intensity from each channel at a frequency between 100 hz and 1 khz.

Generally, the optical system is configured to measure a single type of aerosol particle, but may be configured to measure a mixture of aerosol particles in other examples. The aerosol particles may be, for example, water vapor, ice crystals, fog, smoke, bioaerosols, dust, or ash. The aerosol may also be a salt aerosol, such as water or oil droplets surrounding NaCl particles. In some examples, the aerosol particles have a diameter between 0.5 μm and 10 μm. Further, the optical system is capable of characterizing aerosol particles having a substantially uniform size or a varied, non-uniform size. Likewise, the optical system is capable of determining the concentration of aerosol particles having a uniform concentration within a given volume or aerosol particles having a non-uniform concentration with local variation within a given volume.

The sensors and sources of the optical system may, for example, be disposed within separate recesses within a surface. In some examples, however, some of the sensors and sources may be co-located within the same recess. Likewise, some of the sensors and sources may be disposed on the exterior of the surface rather than within a recess.

In some examples, the optical system may be configured such that the sources and sensors are be disposed along a common axis. In other examples, the optical system may be configured to have two or more sources located on a first axis and two or more sources disposed along a second axis that intersects and is perpendicular to the first axis. Alternatively, the optical system may be configured such that the first axis and second axis are parallel, do not intersect, and are spaced apart by a distance. In these configurations, the optical system may have additional sources or sensors disposed along a third axis and a fourth axis that are parallel to each other and perpendicular to the first and second axes.

In other examples, the optical system may be configured to have two or more sources and two or more sensors radially distributed on a surface around a center point. In these configurations, the sensors and sources may be distributed to be equidistant from the center point or may be disposed at various distances from the center point, depending on the measurement volumes the system is configured to characterize. Further, the optical system may be configured such that the sensors and sources are disposed radially within two concentric circles. In some of these configurations, the sources and sensors can be configured to measure the same measurement volume. For example, the angle between a source or sensor within the outer circle, the surface, and the electromagnetic radiation emitted or received by the source or sensor can measure between 5° and 70°, and the angle between a source or sensor within the inner circle, the surface, and the electromagnetic radiation emitted or received by the source or sensor can measure between 60° and 90°.

In some examples, the optical system may be connected to a plurality of identical optical systems to form a sensor network capable of measuring average particle diameter, particle concentration, phase, or particle type at various locations throughout a volume of aerosol particles. Each of the sensors that forms the sensor network can be disposed, for example, within a chamber suitable for holding aerosols. In these examples, each of the plurality of identical optical systems may be connected a single controller or each may have individual controllers that are connected to a network controller that is capable of generating a three-dimensional map displaying average particle diameter, concentration, phase, or particle type at the various locations or volumes measured by the sensor network. After generating the three-dimensional map, the network controller is capable of outputting the map as coordinate data, as an image or array of pixels, or in a different format suitable for visualization or use in other applications. Advantageously, the three-dimensional map can be used to determine local variations of aerosol characteristics at each of the locations measured by the sensor network and thereby assess overall homogeneity of the volume of aerosol particles. Further, employing multiple sensors, rather than measuring multiple regions with a single sensor, allows for characterization of aerosols throughout an area without increasing the size of the measurement volume which would otherwise increase the likelihood of solid objects to be within the measurement volume.

For some aerosols, one or more sources of the optical system may be configured to emit electromagnetic radiation having a first range of wavelengths that can be absorbed by the aerosol particles and cause the aerosol particles to emit electromagnetic radiation through fluorescence a second range of wavelengths that is longer than the first range. In these examples, the sensors can be configured to receive the fluoresced electromagnetic radiation and the system can be configured to determine an aerosol parameter based on the fluoresced electromagnetic radiation.

FIG. 1A is a perspective view of an example of a system for characterizing aerosols. Sensor system 100 has first source 102, second source 104, first sensor 106, second sensor 108, and third sensor 110, which are depicted as located on surface 112. Generally, first source 102 is configured to emit first electromagnetic radiation pulse 114 and second source 104 is configured to emit second electromagnetic radiation pulse 116. In the depicted example, first electromagnetic radiation pulse 114 and second electromagnetic radiation pulse 116 are aimed to illuminate and collide with aerosol particles 118, scattering first radiation pulse 114 and second electromagnetic radiation pulse 116. Generally, first radiation pulse 114 and second electromagnetic radiation pulse 116 are scattered by aerosol particles in all directions. In the examples depicted in FIG. 1A, some of the scattered electromagnetic radiation returns follow return path 122a, return path 122b, and return path 122c, and are received by first sensor 106, second sensor 108, and third sensor 110, respectively.

Sensor system 100 also includes controller 120, which may be operatively connected to provide two-way communication with first source 102, second source 104, first sensor 106, second sensor 108, and third sensor 110. Generally, controller 120 is configured to alternatingly emit first electromagnetic radiation pulse 114 from first source 102 and second electromagnetic radiation pulse 116 from second source 104. In some examples, controller 120 is configured to receive electromagnetic radiation returns from each pulse alternatingly, such that returns from first electromagnetic radiation pulse 114 and second electromagnetic radiation pulse are received by first sensor 106 before returns from first electromagnetic radiation pulse 114 and second electromagnetic radiation pulse are received by second sensor 108, which are received before returns from first electromagnetic radiation pulse 114 and second electromagnetic radiation pulse are received by third sensor 110. In other examples, controller 120 is configured to receive electromagnetic radiation returns from first electromagnetic radiation pulse 114 with first sensor 106, second sensor 108, and third sensor 110 before receiving electromagnetic radiation returns from second electromagnetic radiation pulse 116 with first sensor 106, second sensor 108, and third sensor 110.

First electromagnetic radiation pulse 114 has a first wavelength range and second electromagnetic radiation pulse 116 has a second wavelength range. Generally, the first wavelength range and second wavelength range are selected based on aerosol particle size. For example, longer wavelengths of electromagnetic radiation may be preferred for larger aerosol particles. In some examples, one or both of first source 102 and second source 104 are configured such that first electromagnetic radiation pulse 114 or second electromagnetic wavelength pulse 116 has a wavelength range greater than or equal to 200 nm and less than or equal to 600 nm corresponding to the ultraviolet to orange visible light spectrum. In other examples, one or both of first source 102 and second source 104 are configured such that first electromagnetic radiation pulse 114 or second electromagnetic wavelength pulse 116 has a wavelength range greater than or equal to 600 nm and less than or equal to 1200 nm corresponding to an orange to near-infrared spectrum. The wavelengths of one or both of first electromagnetic radiation pulse 114 and second electromagnetic radiation pulse 116 may also be in the infrared spectrum. For example, one or both of first electromagnetic radiation pulse 114 and second electromagnetic radiation pulse 116 may have a wavelength range greater than or equal to 1200 nm and less than or equal to 6000 nm. Alternatively, the wavelength range of one or both of first electromagnetic radiation pulse 114 and second electromagnetic radiation pulse 116 may be greater than or equal to 6000 nm and less than or equal to 12000 nm.

First sensor 106, second sensor 108, and third sensor 110 are configured to provide signals to controller 120. Using these signals, controller 120 determines electromagnetic intensity data to characterize aerosol particles. Generally, first sensor 106, second sensor 108, and third sensor 110 are oriented and configured to receive scattered electromagnetic radiation returns along electromagnetic radiation return paths 122a-c. First sensor 106, second sensor 108, and third sensor 110 are also configured to receive ambient electromagnetic radiation.

In the example depicted in FIG. 1A, surface 112 has a substantially flat shape and first source 102, second source 104, first sensor 106, second sensor 108, and third sensor 110 are disposed in recesses within surface 112.

Figure 1B:
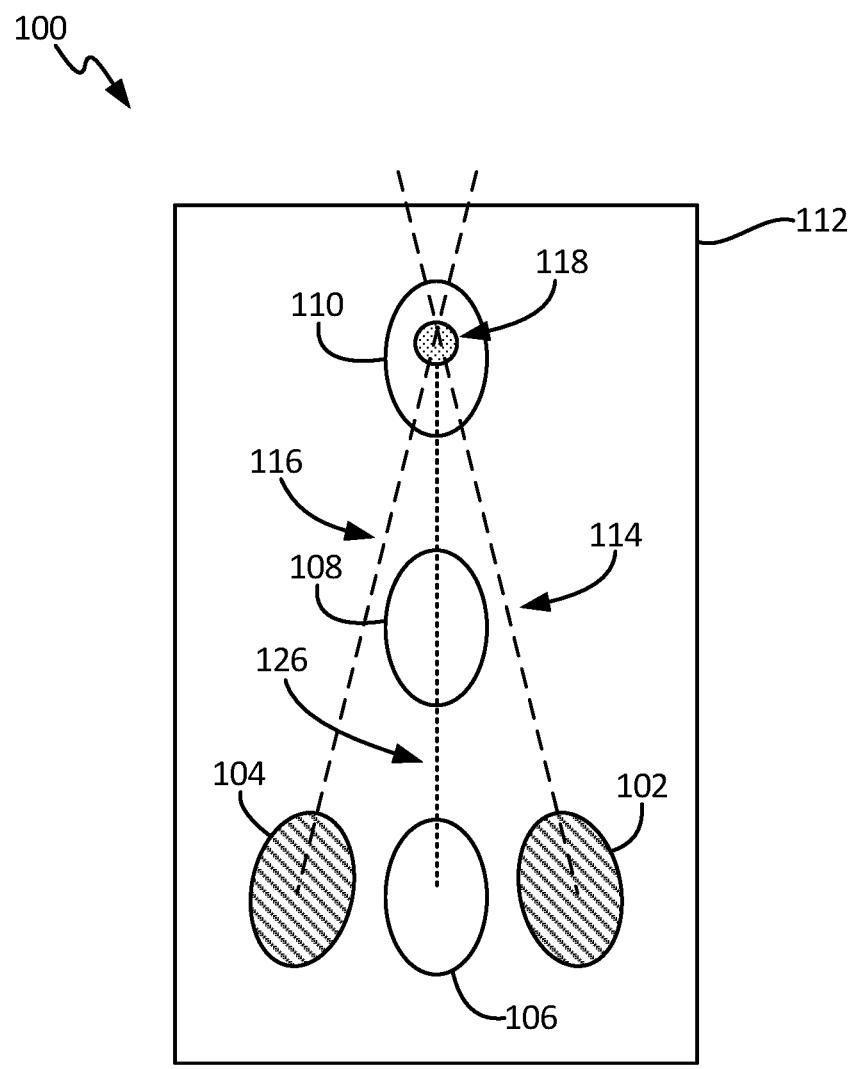
FIG. 1B is a plane view of an example of a system for characterizing aerosols.

FIG. 1B is a plane view of system 100 for characterizing aerosols depicted in FIG. 1A. In the depicted example of sensor system 100, first sensor 106, second sensor 108, third sensor 110, and aerosol particles 118 are disposed along medial plane 126. First source 102 is disposed on one side of medial plane 126 and second source 104 is disposed on the opposing side of medial plane 126. Generally, medial plane 126 extends away from surface 112 at an angle normal to surface 112. Further, first source 102, second source 104, and first sensor 106 are disposed along an axis that is perpendicular to medial plane 126.

In the example depicted in FIG. 1B, first source 102 and second source 104 are oriented such that first electromagnetic radiation pulse 114 and second electromagnetic radiation pulse 116 are aimed at a point along medial plane 126 directly above third sensor 110. In another example, first source 102 and second source 104 are oriented such that first electromagnetic radiation pulse 114 and second electromagnetic radiation pulse 116 are aimed at a point along medial plane 126 directly above second sensor 108. Generally, first source 102 and second source 104 are oriented such that first electromagnetic radiation pulse 114 and second electromagnetic radiation pulse 116 are aimed at a point along medial plane 126 between second sensor 108 and third sensor 110.

In operation, first source 102 emits first electromagnetic radiation pulse 114 which is scattered as electromagnetic radiation returns received by first sensor 106, second sensor 108, and third sensor 110. Each of the sensors produce signals representative of respective returns that are received by controller 120. Second source 104 emits second electromagnetic radiation pulse 116 that is scattered as electromagnetic radiation returns received by first sensor 106, second sensor 108, and third sensor 110, which produce signals that are received by controller 120. The signals produced by first sensor 106, second sensor 108, and third sensor 110 may be, for example, analog signals that are converted to digital signals by an analog to digital converter before being received by controller 120.

The intensity values determined by controller 120 in response to the electromagnetic radiation returns received by third sensor 110 from first electromagnetic radiation pulse 114 and second electromagnetic radiation pulse 116 form a first channel and a second channel, respectively. The intensity values determined by controller 120 in response to the radiation returns received by second sensor 108 from first electromagnetic radiation pulse 114 and second electromagnetic radiation pulse 116 form a third channel and a fourth channel, respectively. The intensity values determined by controller 120 in response to the radiation returns received by first sensor 106 from first electromagnetic radiation pulse 114 and second electromagnetic radiation pulse 116 form a fifth channel and a sixth channel, respectively. The first channel, second channel, third channel, fourth channel, fifth channel, and sixth channel generally represent intensities of the electromagnetic radiation returns received by first sensor 106, second sensor 108, and third sensor 110. Thus, sensor system 100 can define a maximum of six measurement volumes.

Generally, controller 120 can determine the average diameter and concentration of a plurality of aerosol particles using the intensity values from the first channel, second channel, third channel, fourth channel, fifth channel, and sixth channel.

Figure 2A:
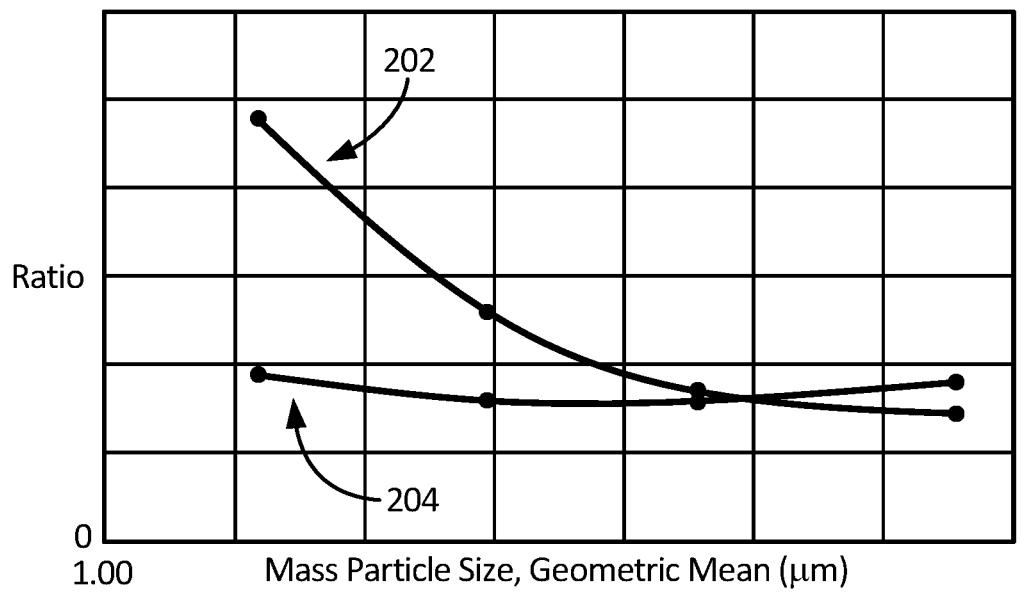
FIG. 2A is an example of a graph of intensity ratios plotted against an aerosol parameter.

FIG. 2A depicts an example of ratio data for a water aerosol, including curve 202 and curve 204 obtained using sensor system 100. Curve 202 displays the ratio of the intensity values received from two of the channels. Curve 202 has a sufficient non-zero slope to allow curve 202 to be useful for determining the average diameter for water aerosols having an unknown average diameter. In addition, curve 202 is a one-to-one function such that for each ratio there is only one corresponding mass particle size.

For some aerosols, including water aerosols, sensor position relative to the position of first source 102 and second source 104 can impact the ratio data generated by controller 120. For example, curve 204 displays the ratio of the intensity data received from two different channels than those used to generate curve 202. Curve 204 has a near zero slope and is not a one-to-one function, meaning that multiple particle diameters are capable of returning the same ratio of intensity data, reducing the effective range of curve 204 for determining the average diameter for water aerosols having an unknown average diameter relative to curve 202.

Figure 2B:
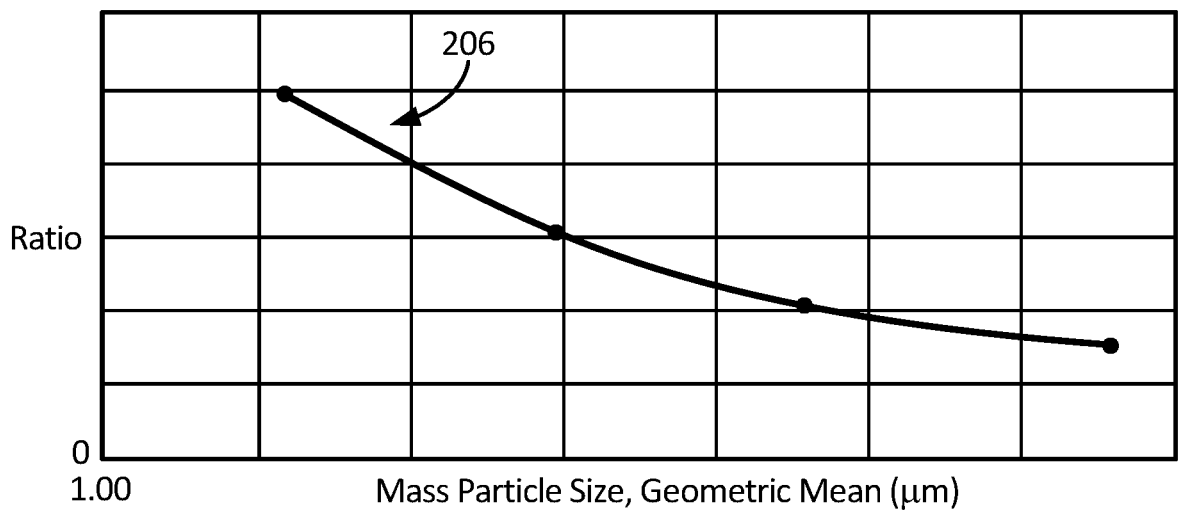
FIG. 2B is an example of a graph of intensity ratios plotted against an aerosol parameter.

FIG. 2B depicts another example of ratio data for a water aerosol obtained using sensor system 100. Curve 206 is obtained by dividing curve 202 by curve 204. Advantageously, curve 206 has improved slope over either curve 202 or curve 204 and therefore can be used to more accurately determine the average diameter for water aerosols than either curve 202 or curve 204.

For some aerosols, ratios of channels corresponding to intensity data from the same sensor, such as the ratio of the second channel to the first channel (both of which include first sensor 106) may be useful for determining average particle diameter. For other aerosols, ratios of channels corresponding to intensity data from different sensors, such as the ratio of the fourth channel (which includes second sensor 108) to the second channel (which includes first sensor 106), may be useful for certain aerosol particles. Likewise, ratios of more than three channels may be useful for determination of average particle diameters. In addition, multiple ratios may also be useful for the characterization of certain aerosols.

Figure 3:
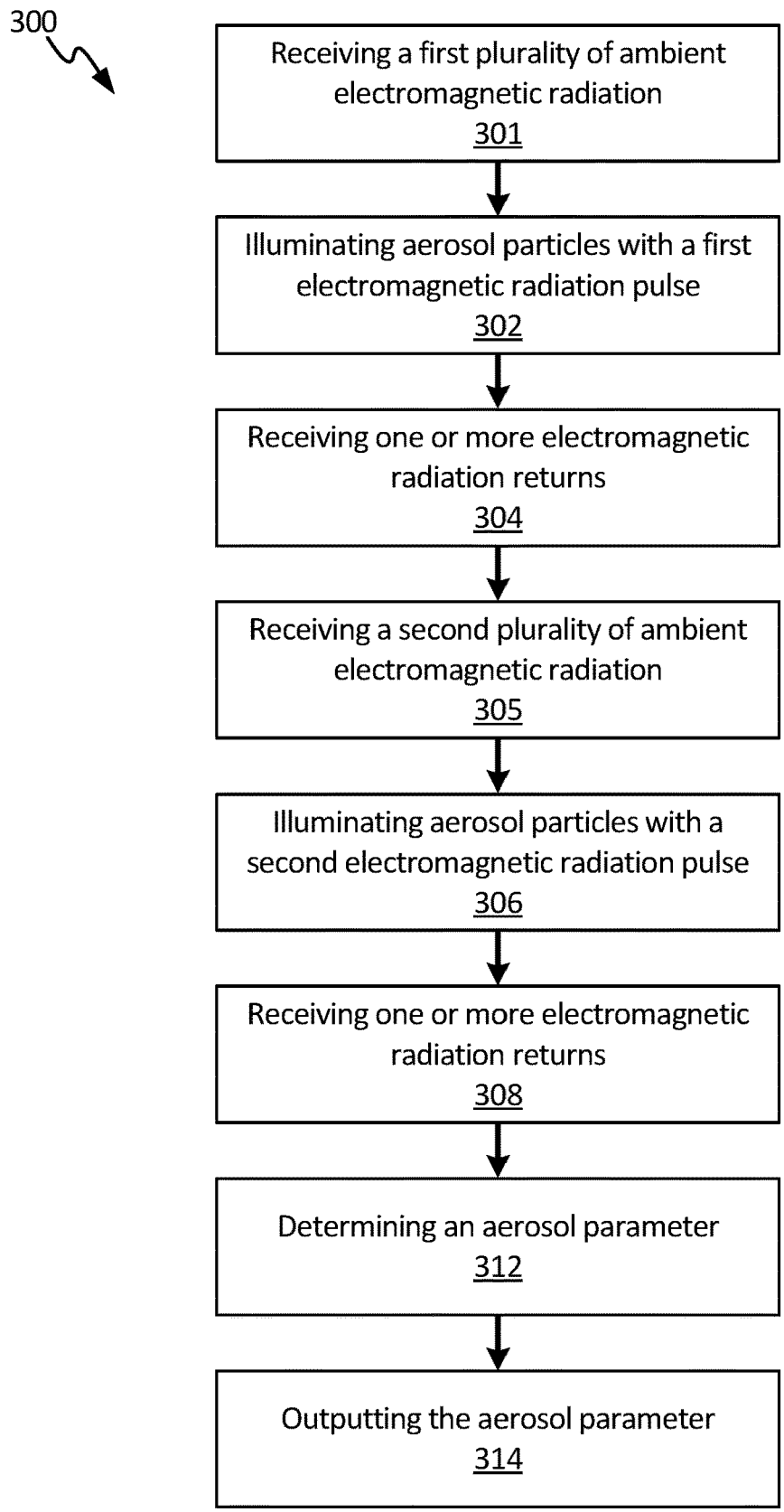
FIG. 3 is a flow diagram of an example of a method of characterizing an aerosol.

FIG. 3 shows a flow diagram of an example of a method of characterizing an aerosol. Method 300 includes steps of illuminating aerosol particles with a first pulse and then receiving at least one radiation return. Method 300 further includes illuminating the aerosol particles with a second pulse and receiving at least one radiation return. The received radiation returns are used to determine an aerosol parameter which is then output. Method 300 also includes receiving a first ambient electromagnetic radiation and receiving a second ambient electromagnetic radiation.

The first plurality of ambient electromagnetic radiation is received in step 301. The first plurality of ambient electromagnetic radiation consists of radiation present in ambient conditions (i.e., without emitted electromagnetic radiation from the sensor system) and has a plurality of wavelengths. The processing device is capable of determining a first plurality of ambient intensities based on signals received from the first sensor in response to receiving the first plurality of ambient electromagnetic radiation. Generally, the first plurality of ambient electromagnetic radiation is received using the first sensor before illuminating the aerosol particles with the first electromagnetic radiation pulse in step 302.

In step 302, aerosol particles are illuminated with a first electromagnetic radiation pulse emitted from a first source. The aerosol particles are located within a measurement volume, wherein the measurement volume defines the three-dimensional volume where the emitting cone overlaps with one or more receiving cones. The scattered radiation forms at least one electromagnetic radiation return.

Generally, the first electromagnetic radiation pulse has a first wavelength range. The first wavelength range may be, for example, greater than or equal to 200 nm and less than or equal to 600 nm. The first wavelength range may also be greater than or equal to 600 nm and less than or equal to 1200 nm. In other examples, first wavelength range may be greater than or equal to 1200 nm and less than or equal to 6000 nm. The first wavelength range may also be greater than or equal to 6000 nm and less than or equal to 12000 nm.

At least one radiation return is received in step 304. Generally, the at least one radiation return is received by at least one sensor connected to a processing device and has the first wavelength range. The processing device is capable of determining at least one intensity based one of the at least one radiation returns. In some examples, the processing device may be a controller that includes at least one processor and a computer-readable memory.

The second plurality of ambient electromagnetic radiation is received in step 305. The second plurality of ambient electromagnetic radiation consists of radiation present in ambient conditions (i.e., without emitted electromagnetic radiation from the first source or second source) and has a plurality of wavelengths. Generally, the second ambient electromagnetic radiation is received using the same sensor or sensors that received the at least one electromagnetic radiation return in step 308 before illuminating the aerosol particles with the second electromagnetic radiation pulse in step 306. The processing device is capable of determining a second plurality of ambient intensities based on signals received from the one or more sensors in response to receiving the second ambient electromagnetic radiation in step 305.

The aerosol particles within the measurement volume are illuminated with a second electromagnetic radiation pulse in step 306. The second electromagnetic radiation pulse is scattered by the aerosol particles to form at least one radiation return. Generally, the second electromagnetic radiation pulse is emitted by a second source. In other examples, the second electromagnetic radiation pulse is emitted by the first source. In some examples, the second electromagnetic radiation pulse is emitted after the at least one electromagnetic radiation return is received in step 304. In other examples, the second electromagnetic radiation pulse is emitted simultaneously or substantially simultaneously with the first electromagnetic radiation pulse emitted in step 302.

Generally, the second electromagnetic radiation pulse has a second wavelength range. In some examples, the second wavelength range is greater than or equal to 200 nm and less than or equal to 600 nm. In other examples, the second wavelength range is granter than or equal to 600 nm and less than or equal to 1200 nm. In other examples, second wavelength range may be greater than or equal to 1200 nm and less than or equal to 6000 nm. The second wavelength range may also be greater than or equal to 6000 nm and less than or equal to 12000 nm.

At least one electromagnetic radiation return is received in step 308. Generally, the at least one electromagnetic radiation return is received by the first sensor and has the second wavelength range. In other examples, the at least one electromagnetic radiation return is received by a second sensor that is spaced from the first sensor and is also connected to the processing device. Generally, the processing device is capable of determining at least one intensity based on the at least one electromagnetic radiation return.

The processing device is capable of determining a plurality of ambient intensities from the ambient electromagnetic radiation received in steps 301 and 305. Generally, the processing device uses the plurality of ambient intensities, the intensities corresponding to the electromagnetic radiation returns received in steps 304 and 308, and an algorithm to determine the aerosol parameter in step 312.

Generally, the algorithm is capable of using the plurality of ambient intensities and the intensities corresponding to the returns received in steps 304 and 308 to create corrected intensities. The algorithm is then capable of using the corrected intensities to determine the aerosol parameter. The algorithm may produce corrected intensities, for example, by subtracting the plurality of intensities corresponding to the ambient electromagnetic radiation received in steps 301 and 305 from the intensities corresponding to the electromagnetic radiation returns received in steps 304 and 306, respectively.

The intensities or corrected intensities are used by the processing device to determine an aerosol parameter in step 312. In some examples, the aerosol parameter is indicative of the average diameter of the aerosol particles. In other examples, the aerosol parameter is indicative of the concentration of the aerosol particles within the measurement volume, a phase of the aerosol particles, or a particle type of the aerosol particles. Generally, the processing device determines the aerosol parameter based on intensity values and an algorithm. The algorithm may take, for example, a ratio equal to an intensity corresponding to a radiation return from the first pulse divided by an intensity corresponding to a radiation return from the second pulse. In some examples, however, the algorithm uses a single intensity value or other ratios of intensity values to determine the aerosol parameter.

The aerosol parameter is output in step 314. The aerosol parameter may be output by, for example, the processing device as a value. Where the processing device is connected to multiple sensors, the aerosol parameter may be output as, for example, an array of pixels.

In some examples, method 300 optionally includes steps of receiving a first ambient electromagnetic radiation and receiving a second ambient electromagnetic radiation.

Method 300 can also be performed to characterize an aerosol having one or both of a known average particle diameter and a known concentration to create a training data array or training curves. For example, method 300 can be repeated to output a plurality of aerosol parameters where each aerosol parameter was determined at a known average particle size, a known concentration, and a known particle type. This plurality of aerosol parameters can be arranged by the processing device into, for example, an array. In some examples, the array can be a three-dimensional array, wherein one axis is average particle size, one axis is concentration, and one axis is the aerosol parameter. In other examples, the known aerosol parameters can be used to determine two-dimensional training curves. In these examples, the aerosol parameter can be plotted as a function of concentration or of average diameter. In some examples, aerosol parameters can be determined for aerosol particles having other known characteristics in addition to average particle size and concentration. In these examples, the processing device can arrange the known characteristics and the aerosol parameters into a four-dimensional or a higher-dimensional array.

Generally, the training data array or training curves can be used by the processing device in method 300 in conjunction with an algorithm, such as the algorithm used in step 312, to determine the average diameter or the concentration of an aerosol having an unknown average diameter, unknown concentration, or unknown particle type by comparing the aerosol parameter returned for the aerosol to the training data array or training curves.

Further, method 300 can be performed to characterize any suitable aerosol. In some examples, the aerosol is a water aerosol, such as a fog, a liquid water aerosol, or an ice crystal aerosol. In other examples, the aerosol is another suitable aerosol or aerosolized particle, such as smoke, dust, bio-aerosol, or ash. The aerosol may also be a salt aerosol, such as oil droplets surrounding NaCl particles.

In some examples, the first sensor and second sensor are configured with optical filters that filter out certain wavelengths of light. For example, the sensors can be configured with filters that are selected to filter out ambient light but also transmit the wavelengths emitted by the first and second sources. In other examples, the first sensor can be configured with an optical filter that selectively transmits the first wavelength range and the second sensor can be configured with an optical filter that selectively transmits the second wavelength range. In some of these examples, step 302 and step 306 can occur simultaneously so that the aerosol particles are illuminated with the first electromagnetic radiation pulse and the second electromagnetic radiation pulse at the same time.

While method 300 can be performed using any suitable system, one such system is sensor system 100. In other examples, the system used to perform method 300 has a first source, a second source, first sensor, a second sensor, and a processing device connected to each of sources and sensors. The sources and sensors may be disposed, for example, along a surface. In some examples, the first source and second source may be disposed along an axis. The first sensor may, for example, be disposed along a medial plane that is located between the first and second sources. Generally, the medial plane is perpendicular to the axis. In some of these examples, the first sensor is disposed at the intersection between the axis and the medial plane and the second sensor is disposed at another location along the medial plane.

Discussion of Possible Embodiments

The following are non-exclusive descriptions of possible embodiments of the present invention.

A method of characterizing an aerosol, the method comprising illuminating aerosol particles located within a measurement volume with a first electromagnetic radiation pulse emitted from a first source, receiving one or more first electromagnetic radiation returns that have been scattered by the aerosol particles illuminated by the first electromagnetic radiation pulse at one or more sensors, illuminating the aerosol particles within the measurement volume with a second electromagnetic radiation pulse emitted from a second source, receiving one or more second electromagnetic radiation returns scattered by the aerosol particles illuminated by the second electromagnetic radiation pulse at the one or more sensors, determining, using a processing device, at least one first intensity and at least one second intensity, determining, using the processing device, an aerosol parameter, and outputting, by the processing device, the aerosol parameter for characterizing the aerosol.

The method of characterizing an aerosol of the preceding paragraph can optionally include, additionally and/or alternatively, any one or more of the following steps, features, configurations and/or additional components:

A further embodiment of any of the foregoing methods of characterizing an aerosol, wherein the first electromagnetic radiation pulse has a first wavelength range.

A further embodiment of any of the foregoing methods of characterizing an aerosol, wherein the second electromagnetic radiation pulse has a second wavelength range.

A further embodiment of any of the foregoing methods of characterizing an aerosol, wherein the second wavelength range is different from the first wavelength range.

A further embodiment of any of the foregoing methods of characterizing an aerosol, wherein the at least one first intensity is based on the one or more first electromagnetic radiation returns received by the one or more sensors.

A further embodiment of any of the foregoing methods of characterizing an aerosol, wherein the at least one second intensity is based on the one or more second electromagnetic radiation returns received by the one or more sensors.

A further embodiment of any of the foregoing methods of characterizing an aerosol, wherein the aerosol parameter is indicative of an average diameter of the aerosol particles.

A further embodiment of any of the foregoing methods of characterizing an aerosol, wherein the aerosol parameter is indicative of concentration of the aerosol particles.

A further embodiment of any of the foregoing methods of characterizing an aerosol, wherein the aerosol parameter is indicative of a phase of the aerosol particles.

A further embodiment of any of the foregoing methods of characterizing an aerosol, wherein the aerosol parameter is indicative of a particle type of the aerosol particles.

A further embodiment of any of the foregoing methods of characterizing an aerosol, wherein the aerosol parameter is based on an algorithm, the at least one first intensity, and the at least second one intensity.

A further embodiment of any of the foregoing methods of characterizing an aerosol, wherein the algorithm uses a ratio of at least two intensities of the at least one first intensity to determine the aerosol parameter.

A further embodiment of any of the foregoing methods of characterizing an aerosol, wherein the algorithm uses a ratio of at least two intensities of the at least one second intensity to determine the aerosol parameter.

A further embodiment of any of the foregoing methods of characterizing an aerosol, wherein the algorithm uses a ratio of the at least one first intensity and the at least one second intensity to determine the aerosol parameter.

A further embodiment of any of the foregoing methods of characterizing an aerosol, wherein one or both of the first wavelength range and second wavelength range are greater than or equal to 200 nm and less than or equal to 600 nm.

A further embodiment of any of the foregoing methods of characterizing an aerosol, wherein one or both of the first wavelength range and second wavelength range are greater than or equal to 600 nm and less than or equal to 1200 nm.

A further embodiment of any of the foregoing methods of characterizing an aerosol, wherein one or both of the first wavelength range and second wavelength range are greater than or equal to 1200 nm and less than or equal to 6000 nm.

A further embodiment of any of the foregoing methods of characterizing an aerosol, wherein one or both of the first wavelength range and second wavelength range are greater than or equal to 6000 nm and less than or equal to 12000 nm.

A further embodiment of any of the foregoing methods of characterizing an aerosol, wherein the at least one sensor is disposed along a medial plane located between the first and second sources.

A further embodiment of any of the foregoing methods of characterizing an aerosol, wherein the medial plane is perpendicular to an axis extending from the first source to the second source.

A further embodiment of any of the foregoing methods of characterizing an aerosol, wherein the at least one sensor is disposed at the intersection between the medial plane and the axis extending from the first source to the second source.

A further embodiment of any of the foregoing methods of characterizing an aerosol, further comprising illuminating the aerosol particles located within the measurement volume with a third electromagnetic radiation pulse emitted from a third source.

A further embodiment of any of the foregoing methods of characterizing an aerosol, further comprising receiving, at the one or more sensors, one or more third electromagnetic radiation returns scattered by the aerosol particles illuminated by the third electromagnetic radiation pulse.

A further embodiment of any of the foregoing methods of characterizing an aerosol, further comprising illuminating the aerosol particles located within the measurement volume with a fourth electromagnetic radiation pulse emitted from a fourth source.

A further embodiment of any of the foregoing methods of characterizing an aerosol, further comprising receiving, at the one or more sensors, one or more fourth electromagnetic radiation returns scattered by the aerosol particles illuminated by the fourth electromagnetic radiation pulse.

A further embodiment of any of the foregoing methods of characterizing an aerosol, further comprising determining, using the processing device, at least one third intensity based on the one or more third electromagnetic radiation returns received by the one or more sensors.

A further embodiment of any of the foregoing methods of characterizing an aerosol, further comprising determining, using the processing device, at least one fourth intensity based on the one or more fourth electromagnetic radiation returns received by the one or more sensors.

A further embodiment of any of the foregoing methods of characterizing an aerosol, further comprising determining, using the processing device an aerosol parameter indicative of an average diameter of the aerosol particles or a concentration of the aerosol particles, the aerosol parameter based on an algorithm the at least one first intensity, the at least one second intensity, the at least one third intensity, and the at least one fourth intensity.

A further embodiment of any of the foregoing methods of characterizing an aerosol, wherein the algorithm uses a ratio of the at least one first intensity, the at least one second intensity, the at least one third intensity, and the at least one fourth intensity to determine the aerosol parameter.

A further embodiment of any of the foregoing methods of characterizing an aerosol, wherein the third electromagnetic radiation pulse has a third wavelength range.

A further embodiment of any of the foregoing methods of characterizing an aerosol, wherein the fourth electromagnetic radiation pulse has a fourth wavelength range.

A further embodiment of any of the foregoing methods of characterizing an aerosol, further comprising repeating the any of the foregoing methods of characterizing of an aerosol to output a plurality of aerosol parameters, each aerosol parameter of the plurality of aerosol parameters determined at a known average diameter and a known concentration.

A further embodiment of any of the foregoing methods of characterizing an aerosol, further comprising determining, using the processing device, a training array indicative of respective intensities of scattered electromagnetic radiation returns as a function of measured average diameter and measured concentration.

A further embodiment of any of the foregoing methods of characterizing an aerosol, further comprising determining the aerosol parameter based on the algorithm, the at least one intensity, and the training data array.

A further embodiment of any of the foregoing methods of characterizing an aerosol, wherein the algorithm uses a ratio of at least two intensities determined in accordance with any of the foregoing methods of characterizing an aerosol and the training data array to determine the aerosol parameter.

A further embodiment of any of the foregoing methods of characterizing an aerosol, further comprising receiving a first plurality of ambient electromagnetic radiation using the one or more sensors before illuminating the aerosol particles with the first electromagnetic radiation pulse.

A further embodiment of any of the foregoing methods of characterizing an aerosol, further comprising determining, using the processing device, a first plurality of ambient intensities based on the first plurality of ambient electromagnetic radiation.

A further embodiment of any of the foregoing methods of characterizing an aerosol, further comprising receiving a second plurality of ambient electromagnetic radiation using the one or more sensors before illuminating the aerosol particles with the second electromagnetic radiation pulse.

A further embodiment of any of the foregoing methods of characterizing an aerosol, further comprising determining, using the processing device, a second plurality of ambient intensities based on the second plurality of ambient electromagnetic radiation.

A further embodiment of any of the foregoing methods of characterizing an aerosol, an average diameter of the aerosol particles or a concentration of the aerosol particles based on the algorithm, the at least first one intensity, the at least one second intensity, the first plurality of ambient intensities, and the second plurality of ambient intensities.

A further embodiment of any of the foregoing methods of characterizing an aerosol, further comprising outputting, using the processing device, the corrected aerosol parameter for characterizing the aerosol.

A further embodiment of any of the foregoing methods of characterizing an aerosol, further comprising determining, using the processing device, a first corrected intensity by subtracting the first plurality of ambient intensities from the at least one first intensity.

A further embodiment of any of the foregoing methods of characterizing an aerosol, further comprising determining, using the processing device, a second corrected intensity by subtracting the second plurality of ambient intensities from the at least one second intensity.

A further embodiment of any of the foregoing methods of characterizing an aerosol, wherein the algorithm uses a corrected ratio equal to the first corrected intensity divided by the second corrected intensity to determine a corrected aerosol parameter indicative of the average diameter of the aerosol particles.

A further embodiment of any of the foregoing methods of characterizing an aerosol, wherein illuminating the aerosol particles with the first electromagnetic radiation pulse is performed before receiving the second plurality of ambient electromagnetic radiation.

A further embodiment of any of the foregoing methods of characterizing an aerosol, wherein receiving the one or more electromagnetic radiation returns scattered by the aerosol particles illuminated by the first electromagnetic radiation pulse is performed before receiving the second ambient electromagnetic radiation.

A further embodiment of any of the foregoing methods of characterizing an aerosol, wherein the aerosol particles are liquid water aerosol particles.

A further embodiment of any of the foregoing methods of characterizing an aerosol, wherein the aerosol particles are ice aerosol particles.

A further embodiment of any of the foregoing methods of characterizing an aerosol, wherein the aerosol particles are smoke particles.

A further embodiment of any of the foregoing methods of characterizing an aerosol, wherein the aerosol particles are dust particles.

A further embodiment of any of the foregoing methods of characterizing an aerosol, wherein the aerosol particles are bioaerosol particles.

A further embodiment of any of the foregoing methods of characterizing an aerosol, wherein the aerosol particles are ash particles.

A further embodiment of any of the foregoing methods of characterizing an aerosol, wherein the aerosol particles are salt aerosol particles.

A further embodiment of any of the foregoing methods of characterizing an aerosol, wherein the at least one sensor is a first sensor and a second sensor spaced from the first source by a distance.

A further embodiment of any of the foregoing methods of characterizing an aerosol, further comprising receiving a first electromagnetic radiation return scattered by the aerosol particles illuminated by the first electromagnetic radiation pulse at the first sensor.

A further embodiment of any of the foregoing methods of characterizing an aerosol, further comprising receiving a second electromagnetic radiation return scattered by the aerosol particles illuminated by the second electromagnetic radiation pulse at the first sensor.

A further embodiment of any of the foregoing methods of characterizing an aerosol, further comprising receiving a third electromagnetic radiation return scattered by the aerosol particles illuminated by the first electromagnetic radiation pulse at the second sensor.

A further embodiment of any of the foregoing methods of characterizing an aerosol, further comprising receiving a fourth electromagnetic radiation return scattered by the aerosol particles illuminated by the second electromagnetic pulse at the second sensor.

A further embodiment of any of the foregoing methods of characterizing an aerosol, further comprising determining, using the processing device, a third intensity based on the third electromagnetic radiation return received by the second sensor.

A further embodiment of any of the foregoing methods of characterizing an aerosol, further comprising determining, using the processing device, a fourth intensity based on the fourth electromagnetic radiation return received by the second sensor.

A further embodiment of any of the foregoing methods of characterizing an aerosol, further comprising determining, using the processing device, an aerosol size parameter indicative of an average diameter of the aerosol particles within the measurement volume based on a second ratio equal to the quotient of the first intensity and the second intensity divided by the quotient of the third intensity and the fourth intensity.

A further embodiment of any of the foregoing methods of characterizing an aerosol, further comprising outputting, using the processing device, the aerosol size parameter for characterizing of the aerosol particles.

A system for characterizing an aerosol, the system comprising a first source configured to emit a first electromagnetic radiation pulse and illuminate aerosol particles with the first electromagnetic pulse, a second source configured to emit a second electromagnetic radiation pulse and illuminate the aerosol particles with the second electromagnetic pulse, one or more sensors, at least one processor; and computer-readable memory.

The system for characterizing an aerosol of the preceding paragraph can optionally include, additionally and/or alternatively, any one or more of the following steps, features, configurations and/or additional components:

A further embodiment of any of the foregoing systems for characterizing an aerosol, wherein the first electromagnetic radiation pulse has a first wavelength range.

A further embodiment of any of the foregoing systems for characterizing an aerosol, wherein the second electromagnetic radiation pulse has a second wavelength range.

A further embodiment of any of the foregoing systems for characterizing an aerosol, wherein the second wavelength range is different from the first wavelength range.

A further embodiment of any of the foregoing systems for characterizing an aerosol, wherein the one or more sensors are configured to receive one or more first electromagnetic radiation returns scattered by the aerosol particles illuminated by the first electromagnetic radiation pulse.

A further embodiment of any of the foregoing systems for characterizing an aerosol, wherein the one or more sensors are configured to receive one or more second electromagnetic radiation returns scattered by the aerosol particles illuminated by the second electromagnetic radiation pulse.

A further embodiment of any of the foregoing systems for characterizing an aerosol, wherein the computer-readable memory is encoded with instructions that, when executed by the at least one processor, cause the system to illuminate aerosol particles located within a measurement volume with the first electromagnetic radiation pulse.

A further embodiment of any of the foregoing systems for characterizing an aerosol, wherein the computer-readable memory is encoded with instructions that, when executed by the at least one processor, cause the system to receive the one or more first electromagnetic radiation returns at the one or more sensors.

A further embodiment of any of the foregoing systems for characterizing an aerosol, wherein the computer-readable memory is encoded with instructions that, when executed by the at least one processor, cause the system to illuminate the aerosol particles within the measurement volume with the second electromagnetic radiation pulse.

A further embodiment of any of the foregoing systems for characterizing an aerosol, wherein the computer-readable memory is encoded with instructions that, when executed by the at least one processor, cause the system to receive the one or more second electromagnetic radiation returns at the one or more sensors.

A further embodiment of any of the foregoing systems for characterizing an aerosol, wherein the computer-readable memory is encoded with instructions that, when executed by the at least one processor, cause the system to determine at least one first intensity based on the one or more first electromagnetic radiation returns received by the one or more sensors.

A further embodiment of any of the foregoing systems for characterizing an aerosol, wherein the computer-readable memory is encoded with instructions that, when executed by the at least one processor, cause the system to determine at least one second intensity based on the one or more second electromagnetic radiation returns received by the one or more sensors.

A further embodiment of any of the foregoing systems for characterizing an aerosol, wherein the computer-readable memory is encoded with instructions that, when executed by the at least one processor, cause the system to determine an aerosol parameter.

A further embodiment of any of the foregoing systems for characterizing an aerosol, wherein the aerosol parameter is indicative of an average diameter of the aerosol particles.

A further embodiment of any of the foregoing systems for characterizing an aerosol, wherein the aerosol parameter is indicative of a concentration of the aerosol particles.

A further embodiment of any of the foregoing methods of characterizing an aerosol, wherein the aerosol parameter is indicative of a phase of the aerosol particles.

A further embodiment of any of the foregoing methods of characterizing an aerosol, wherein the aerosol parameter is indicative of a particle type of the aerosol particles.

A further embodiment of any of the foregoing systems for characterizing an aerosol, wherein the aerosol parameter is based on an algorithm, the at least one first intensity, and the at least one second intensity.

A further embodiment of any of the foregoing systems for characterizing an aerosol, wherein the computer-readable memory is encoded with instructions that, when executed by the at least one processor, cause the system to output the aerosol parameter for characterizing the aerosol.

A further embodiment of any of the foregoing systems for characterizing an aerosol, wherein the algorithm uses a ratio of at least two intensities of the at least one first intensity to determine the aerosol parameter.

A further embodiment of any of the foregoing systems for characterizing an aerosol, wherein the algorithm uses a ratio of at least two intensities of the at least second first intensity to determine the aerosol parameter.

A further embodiment of any of the foregoing systems for characterizing an aerosol, wherein the algorithm uses a ratio of the at least one first intensity to the at least one second intensity to determine the aerosol parameter.

A further embodiment of any of the foregoing systems for characterizing an aerosol, further comprising a third source configured to emit a third electromagnetic radiation pulse and illuminate aerosol particles with the third electromagnetic pulse.

A further embodiment of any of the foregoing systems for characterizing an aerosol, further comprising a fourth source configured to emit a fourth electromagnetic radiation pulse and illuminate aerosol particles with the fourth electromagnetic pulse.

A further embodiment of any of the foregoing systems for characterizing an aerosol, wherein the one or more sensors are configured to receive one or more third electromagnetic radiation returns scattered by the aerosol particles illuminated by the third electromagnetic radiation pulse.

A further embodiment of any of the foregoing systems for characterizing an aerosol, wherein the computer-readable memory is encoded with instructions that, when executed by the at least one processor, cause the system to illuminate the aerosol particles with the third electromagnetic radiation pulse.

A further embodiment of any of the foregoing systems for characterizing an aerosol, wherein the computer-readable memory is encoded with instructions that, when executed by the at least one processor, cause the system to illuminate the aerosol particles with the fourth electromagnetic radiation pulse.

A further embodiment of any of the foregoing systems for characterizing an aerosol, wherein the computer-readable memory is encoded with instructions that, when executed by the at least one processor, cause the system to receive the one or more third electromagnetic radiation returns at the one or more sensors.

A further embodiment of any of the foregoing systems for characterizing an aerosol, wherein the computer-readable memory is encoded with instructions that, when executed by the at least one processor, cause the system to receive the one or more fourth electromagnetic radiation returns at the one or more sensors.

A further embodiment of any of the foregoing systems for characterizing an aerosol, wherein the computer-readable memory is encoded with instructions that, when executed by the at least one processor, cause the system to determine at least one third intensity based on the one or more third electromagnetic radiation returns.

A further embodiment of any of the foregoing systems for characterizing an aerosol, wherein the computer-readable memory is encoded with instructions that, when executed by the at least one processor, cause the system to determine at least one fourth intensity based on the one or more fourth electromagnetic radiation returns.

A further embodiment of any of the foregoing systems for characterizing an aerosol, wherein the computer-readable memory is encoded with instructions that, when executed by the at least one processor, cause the system to determine the aerosol parameter based on the at least one first intensity, the at least one second intensity, the at least one third intensity, and the at least one fourth intensity.

A further embodiment of any of the foregoing systems for characterizing an aerosol, wherein the one or more sensors are configured to receive one or more fourth electromagnetic radiation returns scattered by the aerosol particles illuminated by the fourth electromagnetic radiation pulse.

A further embodiment of any of the foregoing systems for characterizing an aerosol, wherein one or both of the first wavelength range and second wavelength range are greater than or equal to 200 nm and less than or equal to 600 nm.

A further embodiment of any of the foregoing systems for characterizing an aerosol, wherein one or both of the first wavelength range and second wavelength range are greater than or equal to 600 nm and less than or equal to 1200 nm.

A further embodiment of any of the foregoing systems for characterizing an aerosol, wherein one or both of the first wavelength range and second wavelength range are greater than or equal to 1200 nm and less than or equal to 6000 nm.

A further embodiment of any of the foregoing systems for characterizing an aerosol, wherein one or both of the first wavelength range and second wavelength range are greater than or equal to 6000 nm and less than or equal to 12000 nm.

A further embodiment of any of the foregoing systems for characterizing an aerosol, wherein the at least one sensor is disposed along a medial plane located between the first and second sources.

A further embodiment of any of the foregoing systems for characterizing an aerosol, wherein the medial plane is perpendicular to an axis extending from the first source to the second source.

A further embodiment of any of the foregoing systems for characterizing an aerosol, wherein the at least one sensor is configured to receive a first plurality of ambient electromagnetic radiation.

A further embodiment of any of the foregoing systems for characterizing an aerosol, wherein the at least one sensor is configured to receive a second plurality of ambient electromagnetic radiation.

A further embodiment of any of the foregoing systems for characterizing an aerosol, wherein the computer-readable memory is further encoded with instructions that, when executed by the at least one processor, cause the system to receive a first plurality ambient electromagnetic radiation using the at least one sensor before illuminating the aerosol particles with the first electromagnetic radiation pulse.

A further embodiment of any of the foregoing systems for characterizing an aerosol, wherein the computer-readable memory is further encoded with instructions that, when executed by the at least one processor, cause the system to determine a first plurality of ambient intensities based on the first plurality of ambient electromagnetic radiation.

A further embodiment of any of the foregoing systems for characterizing an aerosol, wherein the computer-readable memory is further encoded with instructions that, when executed by the at least one processor, cause the system to receive a second plurality of ambient electromagnetic radiation using the at least one sensor before illuminating the aerosol particles with the second electromagnetic radiation pulse.

A further embodiment of any of the foregoing systems for characterizing an aerosol, wherein the computer-readable memory is further encoded with instructions that, when executed by the at least one processor, cause the system to determine a second plurality of ambient intensities based on the second plurality of ambient electromagnetic radiation.

A further embodiment of any of the foregoing systems for characterizing an aerosol, wherein the computer-readable memory is further encoded with instructions that, when executed by the at least one processor, cause the system to determine a corrected aerosol parameter based on the at least one first intensity, the at least one second intensity, the first plurality of ambient electromagnetic radiation, the second plurality of ambient electromagnetic radiation, and the algorithm.

A further embodiment of any of the foregoing systems for characterizing an aerosol, wherein the computer-readable memory is further encoded with instructions that, when executed by the at least one processor, cause the system to determine a first corrected intensity by subtracting the first plurality of ambient intensities from the at least one first intensity.

A further embodiment of any of the foregoing systems for characterizing an aerosol, wherein the computer-readable memory is further encoded with instructions that, when executed by the at least one processor, cause the system to determine a second corrected intensity by subtracting the second plurality of ambient intensities from the at least one second intensity.

A further embodiment of any of the foregoing systems of characterizing an aerosol, wherein the algorithm uses a corrected ratio equal to the first corrected intensity divided by the second corrected intensity to determine a corrected aerosol parameter indicative of the average diameter of the aerosol particles.

A further embodiment of any of the foregoing systems for characterizing an aerosol, wherein the computer-readable memory is further encoded with instructions that, when executed by the at least one processor, cause the system to output the corrected aerosol parameter for characterizing the aerosol.

A system for characterizing an aerosol comprising a chamber capable of containing the aerosol, a plurality of systems according to the system of claim 12 disposed at a plurality of sensor locations within the chamber, at least one processor, and encoded with instructions that, when executed by the at least one processor, cause the system to determine a plurality of aerosol parameters corresponding to a plurality of measurement volumes, wherein the plurality of measurement volumes correspond to a plurality of measured locations within the chamber, generate a three-dimensional map displaying, at a plurality of positions on the three-dimensional map corresponding to the plurality of measured locations, the plurality of aerosol parameters, and output the three-dimensional map.

A further embodiment of any of the foregoing systems for characterizing an aerosol, wherein the one or more sensors are a first sensor and a second sensor.

A further embodiment of any of the foregoing systems for characterizing an aerosol, wherein the at least one sensor is disposed at the intersection between the medial plane and the axis extending from the first source to the second source.

A further embodiment of any of the foregoing systems for characterizing an aerosol, wherein the first sensor and second source are disposed along a first axis.

A further embodiment of any of the foregoing systems for characterizing an aerosol, wherein the second sensor and the first source are disposed along a second axis spaced from and parallel to the first axis.

A further embodiment of any of the foregoing systems for characterizing an aerosol, wherein the first sensor, second sensor, first source, and second source are radially arranged around a center point.

A further embodiment of any of the foregoing systems for characterizing an aerosol, wherein the first sensor, second sensor, first source, and second source are equidistant from the center point.

A further embodiment of any of the foregoing systems for characterizing an aerosol, wherein the first sensor and first source are a first distance from the center point.

A further embodiment of any of the foregoing systems for characterizing an aerosol, wherein the second sensor and second source are a second distance from the center point.

A further embodiment of any of the foregoing systems for characterizing an aerosol, further comprising a surface.

A further embodiment of any of the foregoing systems for characterizing an aerosol, wherein the first source is disposed within a first recess of the surface.

A further embodiment of any of the foregoing systems for characterizing an aerosol, wherein the second source is disposed within a second recess of the surface.

A further embodiment of any of the foregoing systems for characterizing an aerosol, wherein the first sensor is disposed within a third recess of the surface.

A further embodiment of any of the foregoing systems for characterizing an aerosol, wherein the second sensor is disposed within a fourth recess of the surface.

A further embodiment of any of the foregoing systems for characterizing an aerosol, wherein the first sensor has a first filter configured to selectively detect the first wavelength and the computer-readable memory is further encoded with instructions that, when executed by the at least one processor, cause the system to receive the second electromagnetic radiation return at the first sensor having the first filter.

A further embodiment of any of the foregoing systems for characterizing an aerosol, wherein the second sensor has a second filter configured to selectively detect the second wavelength and the computer-readable memory is further encoded with instructions that, when executed by the at least one processor, cause the system to receive the second electromagnetic radiation return at the second sensor having the second filter.

A further embodiment of any of the foregoing systems for characterizing an aerosol, wherein the second sensor is spaced from the first sensor by a distance.

A further embodiment of any of the foregoing systems for characterizing an aerosol, wherein the first sensor is configured to receive a first electromagnetic radiation return scattered by the aerosol particles illuminated by the first electromagnetic radiation pulse at the first sensor.

A further embodiment of any of the foregoing systems for characterizing an aerosol, wherein the first sensor is configured to receive a first electromagnetic radiation return scattered by the aerosol particles illuminated by the first electromagnetic radiation pulse at the first sensor.

A further embodiment of any of the foregoing methods of characterizing an aerosol, further comprising receiving a second electromagnetic radiation return scattered by the aerosol particles illuminated by the second electromagnetic radiation pulse at the first sensor.

A further embodiment of any of the foregoing methods of characterizing an aerosol, further comprising receiving a third electromagnetic radiation return scattered by the aerosol particles illuminated by the first electromagnetic radiation pulse at the second sensor.

A further embodiment of any of the foregoing methods of characterizing an aerosol, further comprising receiving a fourth electromagnetic radiation return scattered by the aerosol particles illuminated by the second electromagnetic pulse at the second sensor.

A further embodiment of any of the foregoing methods of characterizing an aerosol, further comprising determining, using the processing device, a third intensity based on the third electromagnetic radiation return received by the second sensor.

A further embodiment of any of the foregoing methods of characterizing an aerosol, further comprising determining, using the processing device, a fourth intensity based on the fourth electromagnetic radiation return received by the second sensor.

A further embodiment of any of the foregoing methods of characterizing an aerosol, further comprising determining, using the processing device, an aerosol size parameter indicative of an average diameter of the aerosol particles within the measurement volume based on a second ratio equal to the quotient of the first intensity and the second intensity divided by the quotient of the third intensity and the fourth intensity.

A further embodiment of any of the foregoing methods of characterizing an aerosol, further comprising outputting, using the processing device, the aerosol size parameter for characterizing of the aerosol particles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of characterizing an aerosol, the method comprising:
    emitting a first electromagnetic radiation pulse from a first source mounted on an exterior surface of an optical system or within one or more recesses of the exterior surface, wherein the first electromagnetic radiation pulse has a first wavelength range and the exterior surface has a flat shape;
    illuminating aerosol particles located within a measurement volume exterior to the optical system with the first electromagnetic radiation pulse;
    receiving one or more first electromagnetic radiation returns that have been scattered by the aerosol particles illuminated by the first electromagnetic radiation pulse at one or more sensors mounted on the exterior surface of the optical system, within the one or more recesses, or both;
    emitting a second electromagnetic radiation pulse from a second source mounted on the exterior surface or within the one or more recesses, wherein the second electromagnetic radiation pulse has a second wavelength range that is different from the first wavelength range;
    illuminating the aerosol particles within the measurement volume with the second electromagnetic radiation pulse;
    receiving one or more second electromagnetic radiation returns scattered by the aerosol particles illuminated by the second electromagnetic radiation pulse at the one or more sensors;
    determining, using a processing device, at least one first intensity based on the one or more first electromagnetic radiation returns received by the one or more sensors;
    determining, using the processing device, at least one second intensity based on the one or more second electromagnetic radiation returns received by the one or more sensors;
    determining an intensity ratio value based on the at least one first intensity and the at least one second intensity;
    determining, using the processing device, an aerosol parameter indicative of an average diameter of the aerosol particles, a concentration of the aerosol particles, or a particle type of the aerosol particles, wherein the aerosol parameter is based on an algorithm, the at least one first intensity, and the at least one second intensity; and
    outputting, by the processing device, the aerosol parameter for characterizing the aerosol.

2. The method of claim 1, wherein one or both of the first and second wavelength ranges are greater than or equal to 200 nm and less than or equal to 600 nm.

3. The method of claim 1, wherein one or both of the first and second wavelength ranges are greater than or equal to 600 nm and less than or equal to 1200 nm.

4. The method of claim 1, wherein one or both of the first and second wavelength ranges are greater than or equal to 1200 nm and less than or equal to 6000 nm.

5. The method of claim 1, wherein one or both of the first and second wavelength ranges are greater than or equal to 6000 nm and less than or equal to 12000 nm.

6. The method of claim 1, and further comprising:
    emitting a third electromagnetic radiation pulse from a third source mounted on the exterior surface or within the one or more recesses;
    illuminating the aerosol particles located within the measurement volume with the third electromagnetic radiation pulse;
    receiving one or more third electromagnetic radiation returns scattered by the aerosol particles illuminated by the third electromagnetic radiation pulse at the one or more sensors;
    emitting a fourth electromagnetic radiation pulse from a fourth source mounted on the exterior surface or within the one or more recesses, wherein the fourth electromagnetic radiation pulse has a fourth wavelength range;
    illuminating the aerosol particles located within the measurement volume with the fourth electromagnetic radiation pulse;
    receiving one or more fourth electromagnetic radiation returns scattered by the aerosol particles illuminated by the fourth electromagnetic radiation pulse at the one or more sensors;
    determining, using the processing device, at least one third intensity based on the one or more third electromagnetic radiation returns received by the one or more sensors;
    determining, using the processing device, at least one fourth intensity based on the one or more fourth electromagnetic radiation returns received by the one or more sensors;
    determining a second intensity ratio value based on the at least one third intensity and the at least one fourth intensity;
    determining, using the processing device, an aerosol parameter indicative of an average diameter of the aerosol particles or a concentration of the aerosol particles, wherein the aerosol parameter is based on an algorithm, the at least one first intensity, the at least one second intensity, the at least one third intensity, and the at least one fourth intensity; and outputting, by the processing device, the aerosol parameter for characterizing the aerosol.

7. The method of claim 1, and further comprising:

repeating the method of claim 1 to output a plurality of aerosol parameters, each aerosol parameter of the plurality of aerosol parameters determined at a known average diameter, a known concentration, and a known particle type; and determining, using the processing device, a training data array indicative of respective intensities of scattered electromagnetic radiation returns as a function of measured average diameter, measured concentration, and measured particle type.

8. The method of claim 7, and further comprising:

determining the average particle size or concentration according to the algorithm, the at least one first intensity, the at least one second intensity, and the training data array.

9. The method of claim 1, and further comprising:

receiving a first plurality of ambient electromagnetic radiation using the one or more sensors before illuminating the aerosol particles with the first electromagnetic radiation pulse;

determining, using the processing device, a first plurality of ambient intensities based on the first plurality of ambient electromagnetic radiation;

receiving a second plurality of ambient electromagnetic radiation using the one or more sensors before illuminating the aerosol particles with the second electromagnetic radiation pulse;

determining, using the processing device, a second plurality of ambient intensities based on the second plurality of ambient electromagnetic radiation;

determining, using the processing device, a corrected aerosol parameter indicative of an average diameter of the aerosol particles or a concentration of the aerosol particles, the corrected aerosol parameter based on the algorithm, wherein the algorithm is a corrected one-to-one function relating a range of corrected intensity ratios to a range of aerosol parameters, and wherein each corrected intensity ratio in the range of corrected intensity ratios corresponds to exactly one unique aerosol parameter in the range of aerosol parameters, wherein each corrected intensity ratio is based on a first corrected intensity and a second corrected intensity, wherein the first corrected intensity is based on the at least one first intensity and the first plurality of ambient intensities, and the second corrected intensity is based on the at least one second intensity and the second plurality of ambient intensities; and outputting, using the processing device, the corrected aerosol parameter for characterizing the aerosol.

10. The method of claim 1, wherein the algorithm is a one-to-one function relating a range of intensity ratios to a range of aerosol parameters, and wherein each intensity ratio in the range of intensity ratios corresponds to exactly one unique aerosol parameter in the range of aerosol parameters.

11. The method of claim 1, wherein the aerosol particles are liquid water aerosol particles, ice aerosol particles, smoke particles, dust particles, bioaerosol particles, ash particles, or salt aerosol particles.

12. An optical system for characterizing an aerosol, the optical system comprising:

an exterior surface having a flat shape;

a first source mounted on the exterior surface or within the one or more recesses and configured to emit a first electromagnetic radiation pulse and illuminate aerosol particles with the first electromagnetic pulse, and wherein the first electromagnetic radiation pulse has a first wavelength range;

a second source mounted on the exterior surface or within the one or more recesses extending from the exterior surface and configured to emit a second electromagnetic radiation pulse and illuminate the aerosol particles with the second electromagnetic pulse, and wherein the second electromagnetic radiation pulse has a second wavelength range that is different from the first wavelength range;

one or more sensors mounted on the exterior surface, within the one or more recesses extending from the exterior surface, or both, wherein the one or more sensors is configured to receive one or more first electromagnetic radiation returns, one or more second electromagnetic radiation returns, or a combination of one or more first electromagnetic radiation returns and one or more second electromagnetic radiation returns, and wherein the one or more first electromagnetic radiation returns are scattered by the aerosol particles illuminated by the first electromagnetic radiation pulse and the one or more second electromagnetic radiation returns are scattered by the aerosol particles illuminated by the second electromagnetic radiation pulse;

at least one processor; and a non-transitory computer-readable memory encoded with instructions that, when executed by the at least one processor, cause the system to:

illuminate aerosol particles located within a measurement volume that is exterior to the optical system with the first electromagnetic radiation pulse;

receive the one or more first electromagnetic radiation returns at the one or more sensors;

illuminate the aerosol particles within the measurement volume with the second electromagnetic radiation pulse;

receive the one or more second electromagnetic radiation returns at the one or more sensors;

determine at least one first intensity based on the one or more first electromagnetic radiation returns received by the one or more sensors;

determine at least one second intensity based on the one or more second electromagnetic radiation returns received by the one or more sensors;

determine an aerosol parameter indicative of an average diameter of the aerosol particles or a concentration of the aerosol particles, the aerosol parameter based on an algorithm, the at least one first intensity, the at least one second intensity; and output the aerosol parameter for characterizing the aerosol.

13. The optical system of claim 12, wherein one or both of the first and second wavelength ranges are greater than or equal to 200 nm and less than or equal to 600 nm.

14. The optical system of claim 12, wherein one or both of the first and second wavelength ranges are greater than or equal to 600 nm and less than or equal to 1200 nm.

15. The optical system of claim 12, wherein the one or more sensors are disposed along a medial plane located between the first and second sources and the medial plane is perpendicular to an axis extending from the first source to the second source.

16. The optical system of claim 15, wherein at least one sensor of the one or more sensors is disposed at the intersection between the medial plane and the axis extending from the first source to the second source.

17. The optical system of claim 12,
wherein the one or more sensors comprises a first sensor and a second sensor; and
wherein the second sensor is spaced from the first sensor by a distance.

18. The optical system of claim 17, wherein the first sensor and the second source are disposed along a first axis, the second sensor and the first source are disposed along a second axis spaced from and parallel to the first axis.

19. The optical system of claim 17,
wherein the first sensor, the second sensor, the first source, and the second source are radially arranged around a center point; and
wherein the first sensor and the first source are a first distance from the center point and the second sensor and the second source are a second distance from the center point.

20. The optical system of claim 12, wherein the one or more sensors, the first source, and the second source are radially arranged around and equidistant from a center point.

* * * * *